United States Patent
Touzelbaev

(10) Patent No.: US 6,984,064 B1
(45) Date of Patent: Jan. 10, 2006

(54) THERMAL TRANSFER MEASUREMENT OF AN INTEGRATED CIRCUIT

(75) Inventor: Maxat Touzelbaev, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 18 days.

(21) Appl. No.: 10/209,159

(22) Filed: Jul. 31, 2002

(51) Int. Cl.
*G01N 25/00* (2006.01)
*G01K 7/00* (2006.01)

(52) U.S. Cl. .............................. 374/43; 374/178
(58) Field of Classification Search ............... 374/43, 374/44, 102, 178, 45, 57; 702/109, 136
See application file for complete search history.

(56) References Cited

U.S. PATENT DOCUMENTS

| | | | | |
|---|---|---|---|---|
| 3,253,221 A * | 5/1966 | Peckover | ..................... | 374/44 |
| 4,001,649 A * | 1/1977 | Young | .......................... | 317/41 |
| 4,284,872 A * | 8/1981 | Graeme | ................. | 219/121 LJ |
| 4,734,641 A * | 3/1988 | Byrd, Jr. et al. | .............. | 374/44 |
| 5,302,022 A * | 4/1994 | Huang et al. | ................. | 374/44 |
| 5,477,076 A * | 12/1995 | Gay et al. | .................... | 257/467 |
| 5,927,853 A * | 7/1999 | Christiaens et al. | .......... | 374/44 |
| 6,132,083 A * | 10/2000 | Enala | .......................... | 374/44 |
| 6,238,086 B1 * | 5/2001 | Mikubo et al. | ............... | 374/43 |
| 6,321,175 B1 * | 11/2001 | Nagaraj | ....................... | 374/152 |
| 6,491,426 B1 * | 12/2002 | Schonath et al. | ............. | 374/45 |
| 6,679,628 B2 * | 1/2004 | Breinlinger | ................ | 374/178 |
| 2001/0021217 A1 * | 9/2001 | Gunther et al. | ............. | 374/178 |

FOREIGN PATENT DOCUMENTS

DE                3832273 A1 *   3/1990

* cited by examiner

*Primary Examiner*—Gail Verbitsky
*Assistant Examiner*—Mirellys Jagan
(74) *Attorney, Agent, or Firm*—Foley & Lardner LLP

(57) ABSTRACT

A system and method may be utilized to thermally characterize a live integrated circuit device. The system and method can determine the thermal transfer function of the device by analyzing environment temperature, and the temperature of the integrated circuit die over a time period. The time period can be between the removal of power to the device and a time when a thermal equilibrium is reached or between other changes in power parameters provided to the device. The thermal characteristics can be utilized in a feed forward algorithm for controlling temperature of the integrated circuit device and to determine interface integrity.

26 Claims, 5 Drawing Sheets

THERMAL TRANSFER MEASUREMENT OF AN INTEGRATED CIRCUIT

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to systems and methods for determining thermal characteristics. More specifically, the present invention relates to systems and methods for determining thermal characteristics of integrated circuits (ICS).

BACKGROUND OF THE INVENTION

Thermal characteristics are critical considerations in any integrated circuit design process. Thermal characteristics are particularly important to the design of packaged integrated circuit devices, such as high performance integrated circuits including microprocessors (e.g., the AMD K-7 Athlon® processor, Intel Pentium4® processor, etc.). A device with less than optimum thermal characteristics can cause device or die failures and/or package failures.

Thermal characteristics over a lot of packaged integrated circuit dies can vary, causing a corresponding variability in device performance. Thermal designs seek to reduce the thermal characteristic variations within the package for consistent and reliable performance.

Generally, one particular thermal characteristic, the thermal transfer function $\theta(\omega)$, can be used to approximate the thermal response of a packaged integrated circuit die. Heretofore, the thermal transfer function has been approximated by collecting temperature readings from a thermal die while power is supplied to it. The thermal die is a replica of the actual integrated circuit die and is typically the same size as the integrated circuit die. The thermal die, however, does not include the circuitry of the integrated circuit but merely approximates the thermal transfer function of the integrated circuit die. The thermal die typically includes resistors for duplicating the power dissipation of the integrated circuit die. Accordingly, it cannot approximate or indicate variations in the thermal transfer function across a lot of dies.

To determine the thermal transfer function, the thermal die is placed in a test fixture and provided power across a spectrum of power levels. The temperature of the thermal die is measured with a thermocouple sensor or embedded on-die sensor, i.e. thermistor or diode, across the spectrum of power levels by conventional equipment to determine the thermal transfer function. The thermal transfer function is utilized for approximations associated with the design and packaging of the integrated circuit die.

As discussed above, the use of the thermal die does not allow the measurement of the actual thermal transfer function of an integrated circuit die. Accordingly, there is a need for a method for determining thermal characteristics of an actual packaged integrated circuit die. Further still, there is a need for using the actual thermal characteristics of the device for feed forward control of temperature in the device.

Even further still, there is a need for in situ transient thermal characterization of a live device.

Yet further still, there is a need for determining the thermal transfer function or thermal response in the frequency domain for a packaged device. Even further, there is a need for a simple and yet effective system for and method of measuring thermal characteristics of an integrated circuit die. Further still, there is a need for a low cost system and method of thermally characterizing a packaged integrated circuit.

SUMMARY OF THE INVENTION

An exemplary embodiment relates generally to a method of measuring a thermal characteristic of an integrated circuit in an environment. The method includes providing power to the integrated circuit at a first parameter, providing power to the integrated circuit after the integrated circuit reaches a thermal equilibrium at a second parameter and measuring temperature until the integrated circuit comes into thermal equilibrium with the environment.

Still another embodiment relates to a system for determining at least one factor related to a thermal transfer function of a packaged integrated circuit die. The system measures temperature from a time when power status is changed from the device to a time when a thermal equilibrium is thereafter reached.

Yet another exemplary embodiment relates to a method of determining in situ a thermal characteristic of an integrated circuit. The method includes steps of placing the integrated circuit on a test pad, allowing the integrated circuit to reach thermal equilibrium in a powered state, changing power to the integrated circuit, and measuring temperature of the integrated circuit. The test pad provides power to the integrated circuit. The temperature of the integrated circuit is measured until the integrated circuit reaches thermal equilibrium.

Still another exemplary embodiment relates to a system for determining a thermal characteristic of an integrated circuit device. The system includes means for determining temperature of an environment, means for sensing temperature of the integrated circuit device and means for providing power to the integrated circuit device. The system also includes means for determining the thermal characteristic. The means for determining the thermal characteristic determines the thermal characteristic in response to the temperature of the environment and the temperature of the integrated device as the integrated circuit device reaches thermal equilibrium from the time when the power is changed.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF EXEMPLARY EMBODIMENTS

Figure 1:
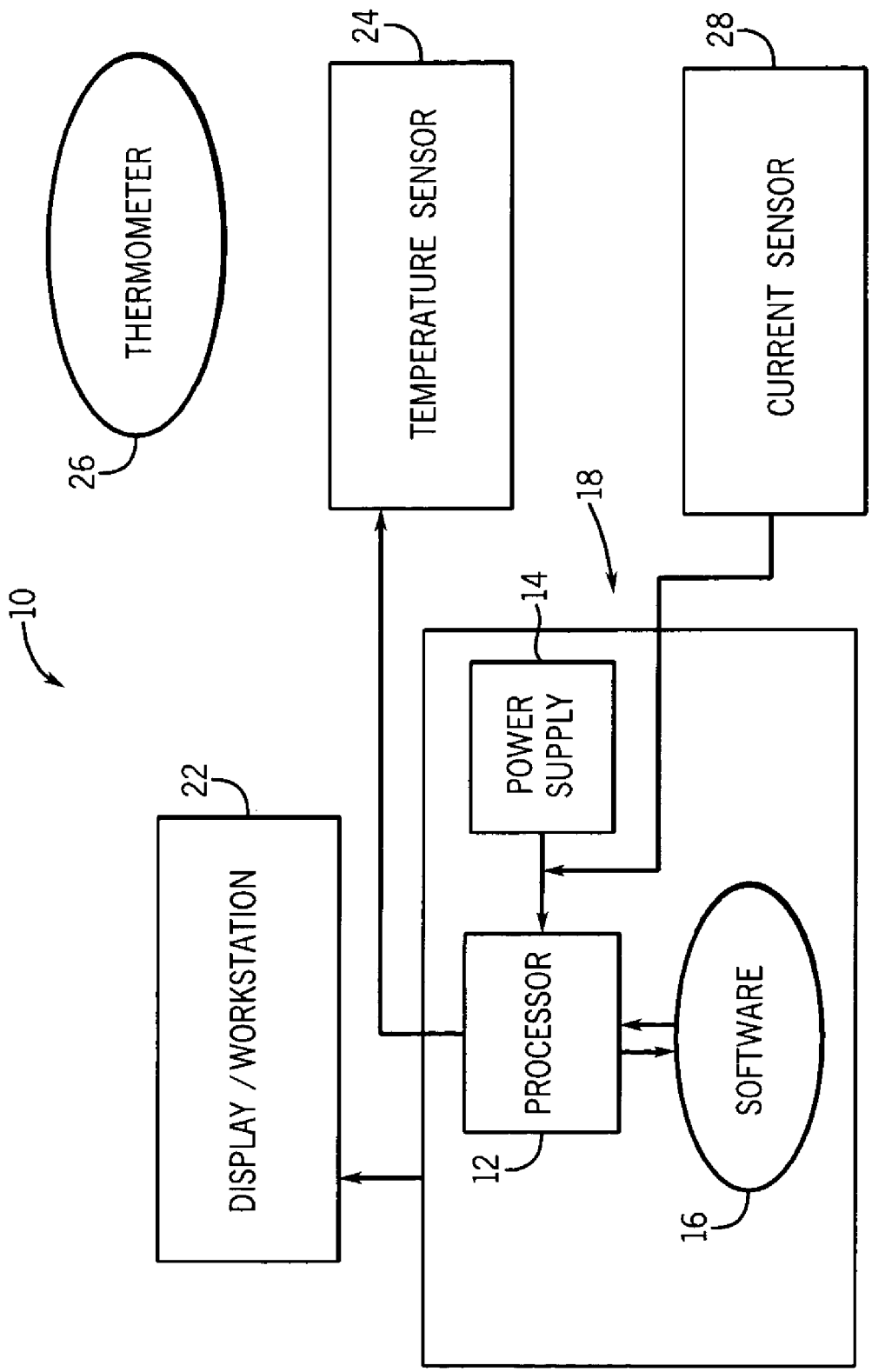
FIG. 1 is a general schematic block diagram of a system for determining a thermal characteristic of an integrated circuit according to an exemplary embodiment.

Referring first to FIG. 1, a system 10 according to an exemplary embodiment is illustrated. System 10 is for determining thermal characteristics associated with an actual integrated circuit device 12.

Unlike conventional thermal test systems, system 10 allows an integrated circuit (e.g., device 12) to be tested in situ. Preferably, device 12 is tested by system 10 after device 12 is fabricated and packaged. System 10 can determine thermal characteristics to determine and monitor the quality of the thermal interface associated with device 12 and use the thermal characteristics in feed forward algorithms.

In a preferred embodiment, system 10 compares the thermal characteristics to a database of characteristics to determine the quality of the actual thermal interface associated with device 12. System 10 can log the thermal characteristics for each device in the database across multiple samples and multiple lots of device 12. In such a way, statistical data associated with the thermal characteristics can be tracked by system 10.

According to another embodiment, the thermal characteristics are loaded into a non-volatile memory in device 12 so that the thermal control algorithms associated with device 12 can utilize the thermal characteristics when determining optimal cooling for device 12. In such an embodiment, device 12 is provided on a test fixture which not only includes power but also includes a data input interface for the thermal characteristics. Preferably, the thermal characteristics are provided into an on-board flash memory or other programmable memory integrated within device 12. The thermal characteristics can be used to determine when to employ and disengage fans, shut down applications, reduce clock speeds, etc.

Integrated circuit device 12 can be a packaged or unpackaged integrated circuit. Preferably, device 12 is a packaged, high performance microprocessor (e.g., an AMD Athlon® MP processor). Integrated circuit device 12 can be supplied power from a power supply 14 and execute software 16. Power supply 14 can be any electronic device for providing electricity (e.g., current and voltage) to integrated circuit 12. Processor 12 is situated in an environment 18.

System 10 preferably includes a display 22, a temperature sensor system 24, a thermometer 26 and a current sensor 28. System 10 is preferably employed to test integrated circuit device 12 after manufacture and packaging. Preferably, system 10 can be provided at a station along a fabrication line associated with the packaging of device 12. Pins or pads associated with device 12 can be used by temperature sensor system 24 to sense temperature and by supply 14 to provide power to device 16.

Thermometer 26 can be any temperature sensing device for sensing a temperature of environment 18. In one embodiment, environment 18 can be a thermal head having a fixed temperature or an ambient environment.

Display 22 can be associated with a computer, server, workstation or other computing device which receives temperature readings from temperature sensor system 24 and thermometer 26. The computing device can calculate thermal characteristics, such as, the thermal transfer function. Preferably, a computing device can calculate the thermal transfer function construed as:

$$\theta(\omega) = \sum_n A_n \cdot \frac{\omega_n}{\omega_n + i \cdot \omega}$$

where $\theta(\omega)$=Temperature response in the frequency domain or thermal transfer function;

$\omega$=angular frequency in rad/s $A_n$=The fitting constant, K;

n=integer between O and N;

$\omega n=1/(2\ t_n)$;

$t_n$=the thermal time constant and i=$\sqrt{1}$.

The thermal or temperature time constant can be determined by: multi-exponential fit using the above equation. Thermal time constants $t_n$ are spaced within specified limits determined by the duration of the measurement, and weight of each exponential, $A_n$, is calculated through least squares fit.

The equations and factors shown above are elements of exemplary embodiments only. The present invention is not limited to the particular equation shown, and is applicable to other thermal characteristics. There are numerous equations which can be used to determine the thermal time constant. Further, there are other factors which can represent the thermal response of device 12.

Preferably, system 10 provides power to integrated circuit device 12 through power supply 14 and allows device 12 to reach thermal equilibrium (a consistent thermal state) while it is powered. Preferably, current sensor 28 can be used to monitor the current provided to power supply 14 to ensure that relatively little modulations in power supply to device 12 are provided (e.g., little or no AC current components to power supplied to device 12). Once device 12 achieves thermal equilibrium, power is removed or changed from processor 12 and temperature is measured by temperature sensor system 24 and recorded as the temperature of device 12 decreases until it reaches the temperature of environment 18 or other thermal equilibrium.

The temperature of environment 18 can be determined via thermometer 26. The computing device uses the temperature readings from temperature sensor system 24 as the temperature of device 12 reaches thermal equilibrium to determine the thermal characteristics of device 12.

The computing device can be triggered to automatically sense the consistent state by analyzing readings from temperature sensor system 24. Alternatively, system 10 can sense the consistent state by waiting a particular amount of time (e.g., 180 seconds) after little or no AC current is provided to device 12. System 10 can ensure that little or no AC current is provided by monitoring sensor 28.

Figure 2:
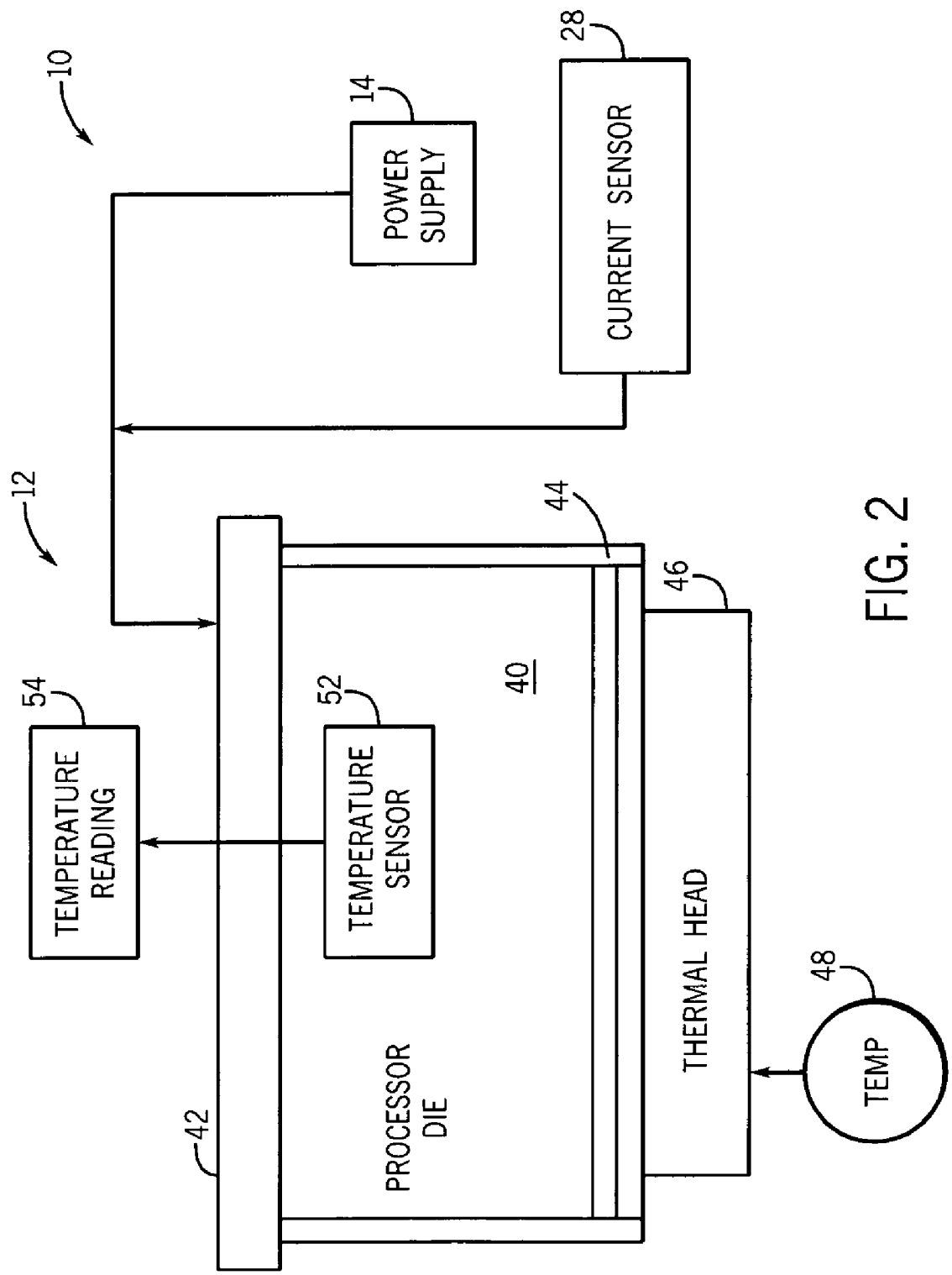
FIG. 2 is a more detailed schematic block diagram of the system illustrated in FIG. 1 including a thermal head according to another exemplary embodiment.

With reference to FIG. 2, system 10 is configured to monitor integrated circuit device 12 embodied as a processor die 40, a package substrate 42, and a package cover 44. Power supply 14 provides power to die 40 through package substrate 42. A thermal head 45 can be in contact with package cover 44.

Thermal head 46 can be set at a fixed temperature such as 20° C. Preferably, thermal head 46 is a heat sinking device such as a one manufactured by Silicon Thermal of Mountain View, Calif. and attached to cover 44. Thermal head 46 can receive water at a constant temperature. If the temperature of thermal head 46 is known, temperature does not need to be measured by thermometer 26. In this way, system 10 can determine the temperature (the known fixed temperature) of environment 18 is thermal head 46 is used. Alternatively, the temperature of thermal head 46 can be sensed through a thermocouple 48.

Electricity (e.g., current and/or voltage) from power supply 14 can be monitored by a sensor such as current sensor 28. Processor die 40 preferably includes a temperature sensor 52. Alternatively, temperature sensor 52 can be a thermocouple attached to an outside portion of package 44. In a preferred embodiment, temperature sensor 52 is a temperature sensing diode or transistor integrated within die 40.

Advantageously, system 10 utilizes an integrated temperature sensing unit within device 12. Generally, the integrated temperature sensing unit is utilized for post-test operations of device 12. In this way, system 10 is able to obtain an accurate temperature reading without an increase in cost associated with temperature sensors. The cost of the interface of those temperature sensors to device 12 can also be reduced by using the integrated temperature sensing unit.

Temperature sensor 52 provides a temperature signal to temperature reading circuit 54. Temperature reading circuit 54 can provide a temperature reading to a display, such as display 22, as well as a computing device for calculating the thermal transfer function. Circuit 54 and display 22 can include memory for recording temperature readings over a period of time.

Figure 3:
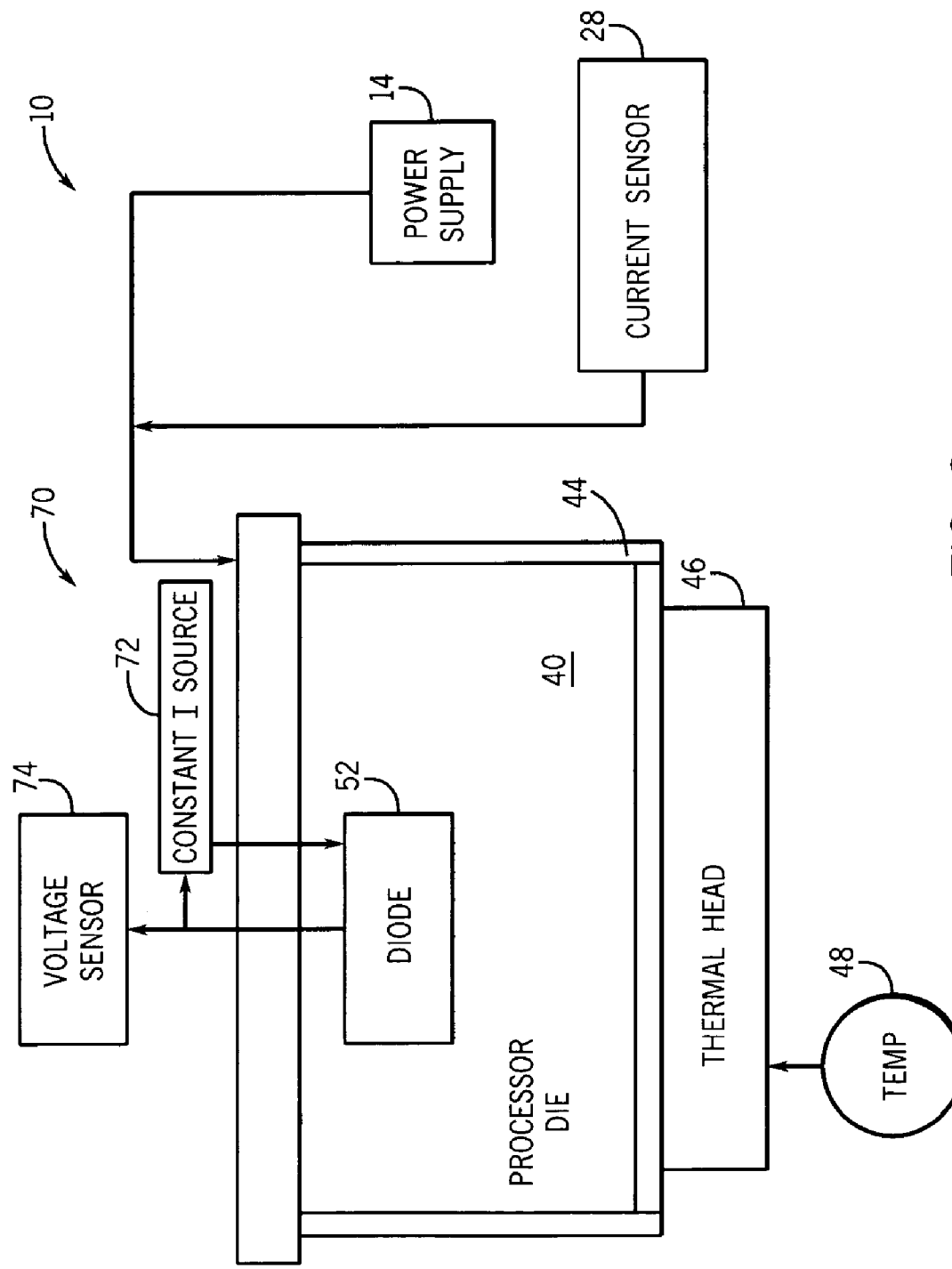
FIG. 3 is an even more detailed block diagram of a perspective view of the system illustrated in FIG. 1 including an internal temperature sensing diode according to yet another exemplary embodiment.
Figure 4:
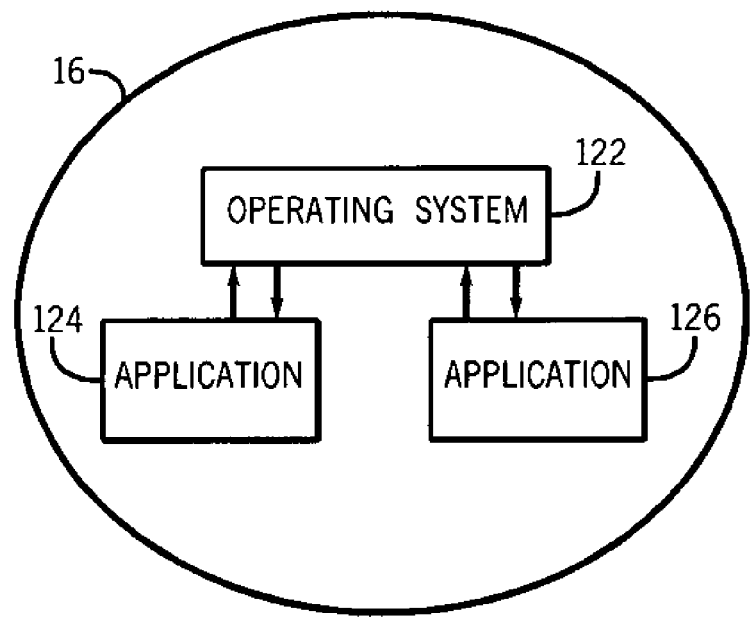
FIG. 4 is a schematic block diagram of software operating on the integrated circuit illustrated in FIG. 1.

With reference to FIG. 3, system 10 includes a temperature sensor system 70 for measuring a temperature associated with processor die 40. Processor die 40 includes a temperature sensitive diode 52 which receives a current from a constant current source 72. Voltage associated with the diode is determined by a voltage sensor 74. Voltage measured by voltage sensor 74 is indicative of the temperature of processor die 40. In a preferred embodiment, temperature sensor 52 is a transistor adapted to be a diode and connected to an anode pin and a cathode pin, such as the thermal sensing diode provided on microprocessors, (e.g., processors manufactured by AMD).

The described embodiments for heat sinking temperature associated with device 12 and determining temperature readings on device 12 and environment 18 are exemplary embodiments only. The details related to these components do not limit the scope of the claim unless specifically required by the claims. For example, the system and method can utilize virtually any temperature sensing and heat sinking apparatus for environment 18 and device 12 to determine thermal characteristics.

Figure 5:
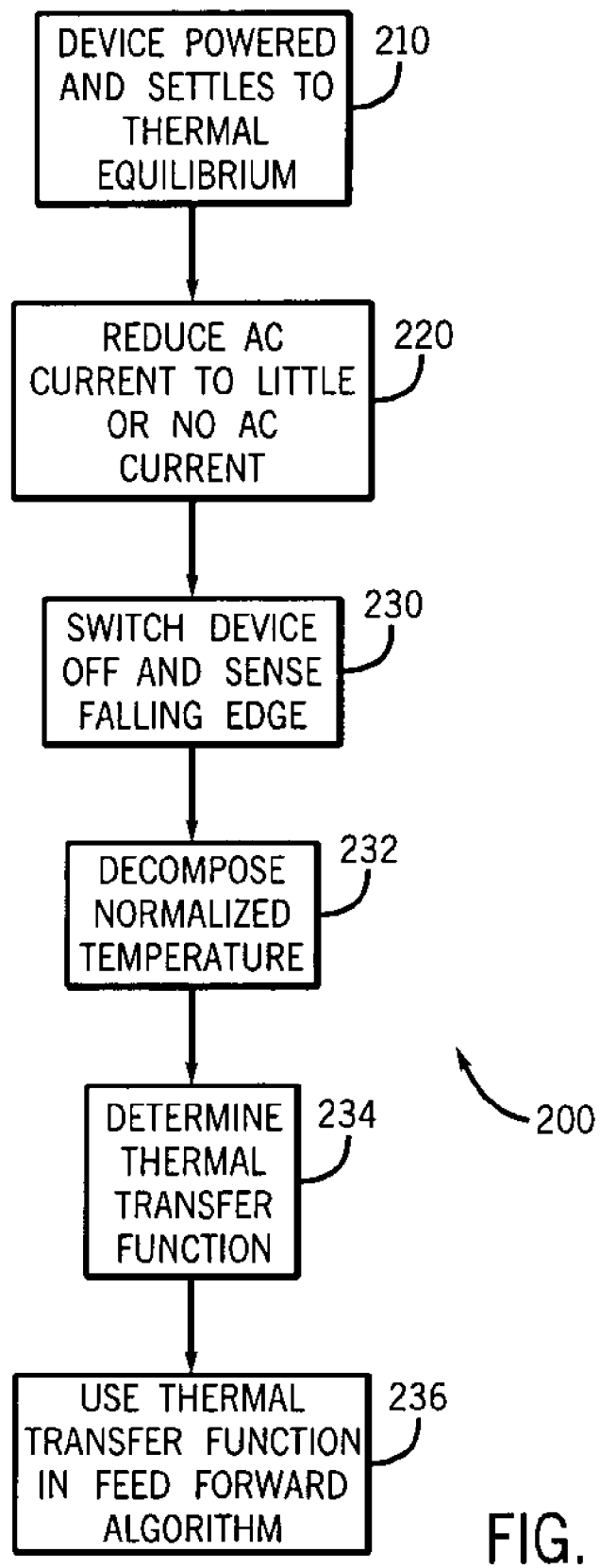
FIG. 5 is a flow diagram showing a method for determining the thermal transfer function of the integrated circuit illustrated in FIG. 1, the method can utilize the system illustrated in FIG. 1 in accordance with still another exemplary embodiment.

With reference to FIGS. 1–5 (particularly FIGS. 4, 5 and 6), the operation of system 10 is described with respect to flow diagram 200. In FIG. 5, at a step 210, device 12 is provided power via power supply 14 and operates software 16 (FIGS. 1–4) such as operating system 122 (FIG. 4) and applications 124 and 126. Device 12 is operated until a thermal equilibrium is reached as measured by temperature sensor 52. A temperature T1 (FIG. 6) is representative of the temperature in step 210. Preferably, a constant temperature for a period of time is reached, such as, a temperature of 90° C. for 180 seconds.

At a step 220, software 16 is operated on device 12 to ensure that reduced AC current or little to no AC current is provided through power supply 14. Preferably, software 16 is operated so that applications 124 and 126 are not initiated or turned off once thermal equilibrium is reached. By not allowing applications 124 and 126 to be turned on or off, AC components of current supplied to device 12 are reduced.

Accordingly, device 12 can be brought into a state in which there is no or little AC current flow into device 14 by ensuring that no new applications are being started or quit. In one alternative embodiment, sensor 28 is monitored to ensure that little AC current is being drawn by device 12.

Figure 6:
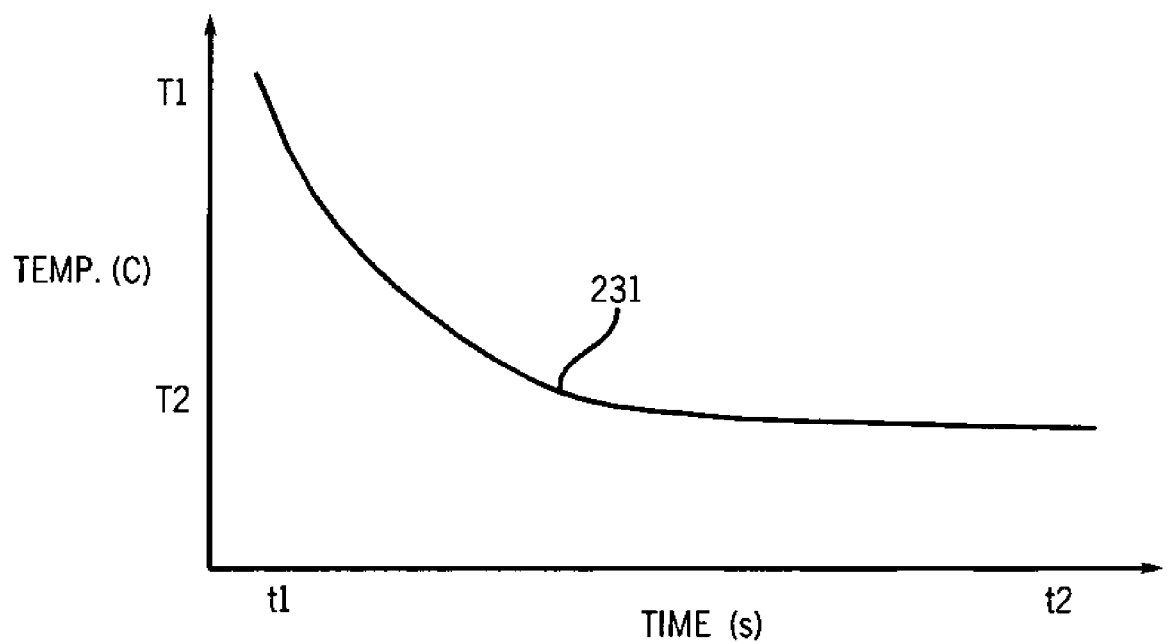
FIG. 6 is a graph showing the temperature of the integrated circuit measured from a time $t_1$ to a time $t_2$.

At a step 230, power from power supply 14 is removed or device 12 is turned off at a time $t_1$ when device 12 is at temperature T1 (shown in FIG. 6). In one embodiment, current sensor 28 senses a falling edge associated with current provided by power supply 14 and system 10 begins recording temperatures sensed by temperature sensor 52 until thermal equilibrium is reached. The temperature falls according to a line 231 in FIG. 6. Alternatively, other changes of power status can be utilized including voltage variations and clock speed changes.

The thermal equilibrium is associated with the temperature of environment 18 or thermal head 46. In a preferred embodiment, the temperature is associated with thermal head 46. As the temperature of device 12 reaches thermal equilibrium associated with its environment 18, temperature readings and the associated time of those readings are recorded. The thermal equilibrium associated with environment 18 or thermal head 46 is at a temperature T2. Device reaches temperature T2 (FIG. 6) at time $t_2$.

The temperature readings are decomposed and normalized at a step 232. The normalized temperature profile is decomposed in the space of exponential functions. Generally, several minutes (e.g., between times t and t2) are required for device 14 to reach environmental temperature or other steady temperatures. The temperature decomposes as an exponential function according to line 231. At a step 234, the thermal transfer function is calculated. The calculation can be performed by a multi-exponential fit.

Accordingly, system 10 performs measurements of a live device and a thermal die is not required. The thermal or temperature time constant calculated from the thermal transfer function can be utilized to verify and monitor the quality of the thermal interface associated with components of package cover 44, substrate 42 and die 40. The thermal transfer function can also be utilized in a feed forward temperature control system controlling the cooling of device 12 in an optional step 236. Knowing the exact thermal transfer function for the actual device, rather than an estimated temperature constant for a lot of devices, allows for a more precise control. Conventional temperature control algorithms can be utilized to control the temperature of device 12. According to such algorithms, fans or other heat dissipation devices can be engaged, applications can be stopped, and clock signals and power can be reduced when particular temperatures are reached.

According to an alternative embodiment, power parameter associated with device 12 can be changed rather than removed entirely from device 12 at step 230. For example, the clock speed can be provided at a first frequency at a time t1 when device 12 is at temperature T1 in step 230. Device 12 is clocked at the second frequency until temperature T2 and time t2 is reached. The thermal coefficient is calculated as described above in response to temperature measurements along line 231.

In this embodiment, power is provided at a first parameter associated with the first frequency and then changed to be provided at a second parameter associated with the second frequency. Power is generally proportional to the frequency of the clock signal. In a preferred embodiment, the first frequency is 1.8 MHz and the second frequency is 600 MHz at first and changed to 1.8 MHz for an inverse temperature response to that shown in FIG. 6.

While the exemplary embodiments illustrated in the FIGS. and described above are presently preferred, it should be understood that these embodiments are offered by way of example only. For example, while system 10 has been described in detail, it is understood that system 10 configurations may be used which do not include each of the listed components in the specific exemplary embodiment. System 10 may be integrated into a one-piece unit, a single piece of test equipment, or combinations of test equipment. While the exemplary embodiments have been disclosed with reference to microprocessors, the invention can be applied to other integrated circuit test systems. Accordingly, the present invention is not limited to a particular embodiment, but extends to various modifications that nevertheless fall within the scope of the appended claims.

What is claimed is:

1. A method of determining a thermal transfer function of an integrated circuit in an environment, the method comprising:
   providing power to the integrated circuit at a first parameter;
   providing the power to the integrated circuit at a second parameter when the integrated circuit reaches a thermal equilibrium with the environment;
   measuring samples of temperature of the integrated circuit until the integrated circuit comes into thermal equilibrium with the environment after the power is provided at the second parameter and determining the thermal transfer function in response to the samples of the temperature;
   storing the thermal transfer function in the integrated circuit; and
   using the stored thermal transfer function in a feed forward temperature control algorithm.

2. The method of claim 1, wherein the temperature is measured using a thermal diode integrated within the integrated circuit.

3. The method of claim 1, wherein the second parameter is zero current.

4. The method of claim 1, wherein the temperature is measured by a sensor, the sensor being a diode receiving power from a constant current source.

5. The method of claim 1, wherein the integrated circuit is brought into a consistent state, the consistent state having a minimal AC current into the integrated circuit before the providing the power at the second power parameter.

6. The method of claim 5, wherein the integrated circuit is a processor and the integrated circuit is brought into the consistent state by not allowing new applications to be started or quit.

7. A method of determining in situ a thermal transfer function of an integrated circuit in an environment, the method comprising steps of:
   placing the integrated circuit on a test pad, the test pad providing power to the integrated circuit;
   allowing the integrated circuit to reach thermal equilibrium with the environment in a powered state, and confirming that thermal equilibrium is reached by using a current sensor for ensuring that a consistent state with relatively small AC current components is obtained before the power is changed;
   changing the power to the integrated circuit;
   measuring temperature samples of the integrated circuit after changing the power until the integrated circuit reaches thermal equilibrium with the environment and determining the thermal transfer function in response to the temperature samples; and
   storing a representation of the thermal transfer function in the integrated circuit.

8. The method of claim 7, wherein the temperature is measured using an internal sensor.

9. The method of claim 7, further comprising operating software with the integrated circuit when the integrated circuit is powered.

10. The method of claim 9, further comprising not allowing applications to be started or stopped before the power is changed.

11. A system for determining a thermal transfer function of an integrated circuit device, the system comprising:
    means for sensing temperature of the integrated circuit device;
    means for providing power to the integrated circuit device; and
    means for determining the thermal transfer function in response to the temperature of the environment and the temperature of the integrated circuit device as the integrated circuit device reaches thermal equilibrium from the time when the power provided to the integrated circuit device is changed; and
    means for storing at least one factor associated with the thermal transfer function in the integrated circuit device, wherein the one factor associated with the thermal transfer function is provided to the integrated circuit for use in a feed forward temperature control algorithm.

12. The system of claim 11, wherein the means for determining temperature of an environment is used to determine the thermal equilibrium.

13. The system of claim 11, further comprising a current sensor for ensuring that a consistent state with relatively small AC current components is obtained before the power is changed.

14. The system of claim 11, further comprising a means for displaying the sensed temperature from the means for sensing temperature of the integrated circuit device.

15. The system of claim 11, wherein the means for sensing includes a diode integral to the integral circuit device.

16. The system of claim 11, wherein the means for determining the temperature of the environment is a thermal head at a fixed temperature.

17. The system of claim 11, wherein the thermal transfer function includes a thermal time constant.

18. The system of claim 11, wherein the integrated circuit device is a processor.

19. The system of claim 11, further comprising software operated in the integrated circuit device, wherein new applications are not started or stopped before the power is changed.

20. A system for determining at least one factor related to a thermal transfer function of a packaged integrated circuit die, the system comprising:
    a thermal transfer circuit;
    a current sensor; and a temperature sensor for measuring a temperature;

wherein the temperature sensor measures temperature of the packaged integrated circuit die from a time when power status of the packaged integrated circuit die is changed until a time when a thermal equilibrium with an environment of the packaged integrated circuit die is thereafter reached on the packaged integrated circuit die and wherein the thermal transfer circuit determines the at least one factor and stores in the integrated package circuit die the at least one factor, the at least one factor being determined from the temperature measured from the time when the power status of the package integrated circuit die is changed until the time when the thermal equilibrium with the environment is thereafter reached, wherein the current sensor is used to ensure that a consistent state with relatively small AC current components is obtained before the power status is changed.

21. The system of claim 20, wherein the factor related to the thermal transfer function is provided to the integrated circuit for use in a feed forward temperature control algorithm.

22. The system of claim 20, wherein the factor is a time constant for the thermal transfer function.

23. The system of claim 20, further comprising: a database for determining the quality of a thermal interface associated with the packaged integrated circuit die.

24. The system of claim 20, wherein the packaged integrated circuit die is a microprocessor.

25. The system of claim 20, wherein the temperature is normalized to determine the thermal transfer function of the packaged integrated circuit die.

26. The system of claim 25, wherein the temperature is measured by a temperature sensitive element is integrated with the integrated circuit die.

\* \* \* \* \*

UNITED STATES PATENT AND TRADEMARK OFFICE
CERTIFICATE OF CORRECTION

PATENT NO. : 6,984,064 B1    Page 1 of 1
DATED      : January 10, 2006
INVENTOR(S) : Maxat Touzelbaev It is certified that error appears in the above-identified patent and that said Letters Patent is hereby corrected as shown below:

<u>Column 8,</u>
After line 21, insert the following:
-- means for determining temperature of an environment, the integrated circuit device being in the environment; --.

Signed and Sealed this

Eighteenth Day of April, 2006

JON W. DUDAS
*Director of the United States Patent and Trademark Office*